REFLEX CHARACTER GENERATOR

Filed Dec. 3, 1969 2 Sheets-Sheet 1

INVENTOR
WILLARD K. BANKS

BY Melvyn D Silver

AGENT 3,666,358
REFLEX CHARACTER GENERATOR
Willard K. Banks, Cupertino, Calif., assignor to International Business Machines Corporation, Armonk, N.Y.
Filed Dec. 3, 1969, Ser. No. 881,807
Int. Cl. G03b *23/02;* G02f *1/28, 1/36*
U.S. Cl. 353—25 14 Claims

ABSTRACT OF THE DISCLOSURE

A reflex character generator comprising a light source positioned to input a light beam to a light deflector, such as a switchable total internal reflection (STIR) light deflector, at such an angle that upon reflection from a reflective character mask located after the light deflector, the reflected light beam in character form will re-enter and then exit the light deflector on a single path separate from the incoming light beam.

FIELD OF THE INVENTION

Figures 1, 2A, 2B, 3:
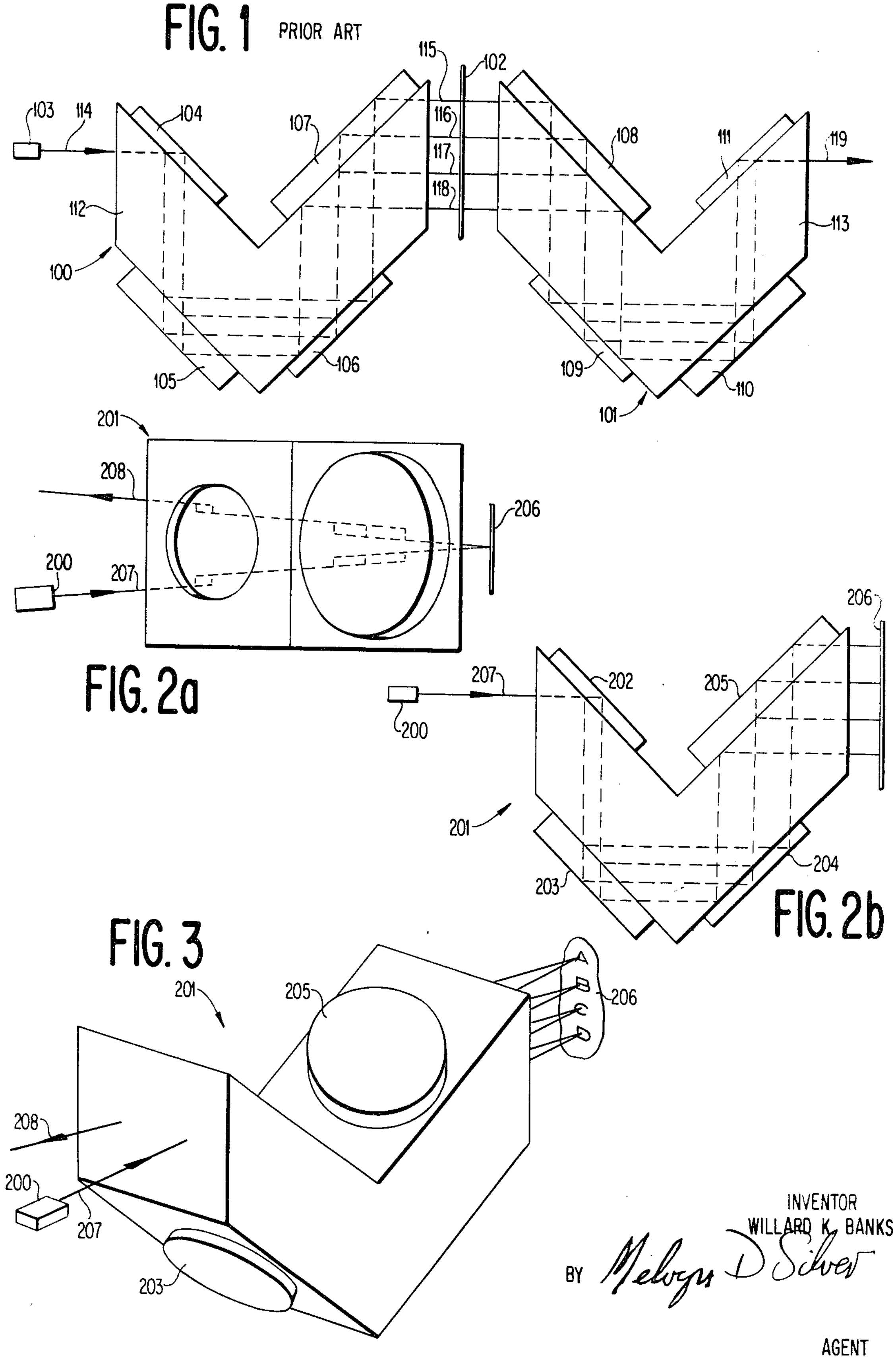
FIG. 1 PRIOR ART, FIG. 2a, FIG. 2b, FIG. 3

This invention relates to character generators in general, and more particularly to character generators utilizing light deflectors specifically adapted to digitally shift a light beam selectively along a preselected path.

BACKGROUND OF THE INVENTION

Various means for generating characters for use in printing, display, and computer memory storage arts are well known in the art. Examples of these systems may be found in U.S. 3,182,574, Fleisher et al., issued May 11, 1965, and assigned to the assignee of this invention, and in U.S. 3,220,013, by T. J. Harris, issued Nov. 23, 1965, and also assigned to the assignee of this invention. These examples of the prior art show various display systems and high speed electro-optic printers. Each of these systems require the generation of a light beam in character form, for subsequent use within the system. These inventions, as with other inventions in these areas, have in common the use of a multiplicity of light deflection or light focusing means, in addition to print-out elements or the final display apparatus. While being reliable and efficient, it is clear that the ideal character generator would have the minimum number of parts, such as light sources, character masks, and light deflection means, as well as high speed and high reliability.

SUMMARY OF THE INVENTION

Objects

Thus, some of the objects of this invention are:

(a) To simplify light beam character generators of the prior art by reducing the number of necessary components in the light deflection stages;

(b) To improve the reliability of light beam character generators by reducing the number of necessary components in the light deflection stages;

(c) To reduce the cost and physical size of light beam character generators by (a) and (b) above;

(d) To utilize well-known components of known-reliability in achieving (a)–(c) above;

(e) To provide a light beam character generator operable in both a reflex and transmission mode simultaneously;

Such as invention being especially useful in the printing, display and memory storage arts.

These and other objects of this invention are met by the reflex character generator of this invention. In a preferred embodiment, this reflex character generator comprises a light source positioned to input a light beam to a light deflector, such as a switchable total internal reflection (STIR) light deflector, at such an angle that upon reflection from a reflective character mask located after the light deflector, the reflected light beam in character form will re-enter and then exit the light deflector on a single path separate from the incoming light beam. Depending upon the type of deflector used, the path length of any one of a predetermined number of possible deflection positions can be maintained constant through the light deflector, if so desired.

Alternative embodiments utilize a step mask to further reduce the size of the light deflector, and also allow a combination of transmission and refliction of a light beam in character form to occur simultaneously. The incoming light beam and outgoing reflected beam in character from are angularly positioned to provide separation of the two beams without additional optical elements, and without relying upon beam characteristics such as polarization coupled with polarization optics.

This invention will best be understood when considered in relation to the drawings and general description.

IN THE DRAWINGS

FIG. 1 shows a prior art light beam character generator in a transmission mode utilizing two light deflectors.

FIG. 2*a* is a top view of FIG. 2*b*, which figures show a reflex character generator having the angular reflection relationship of this invention for a two-stage STIR deflector.

FIG. 3 is an isometric view of the two-stage reflex character generator of FIGS. 2*a* and 2*b*.

Figure 4A:
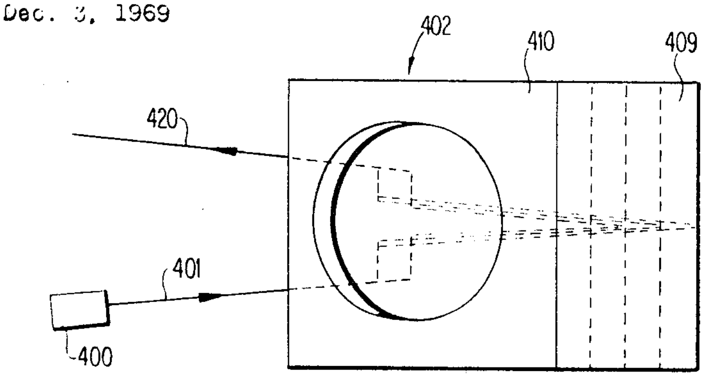
Figures 4B, 5:
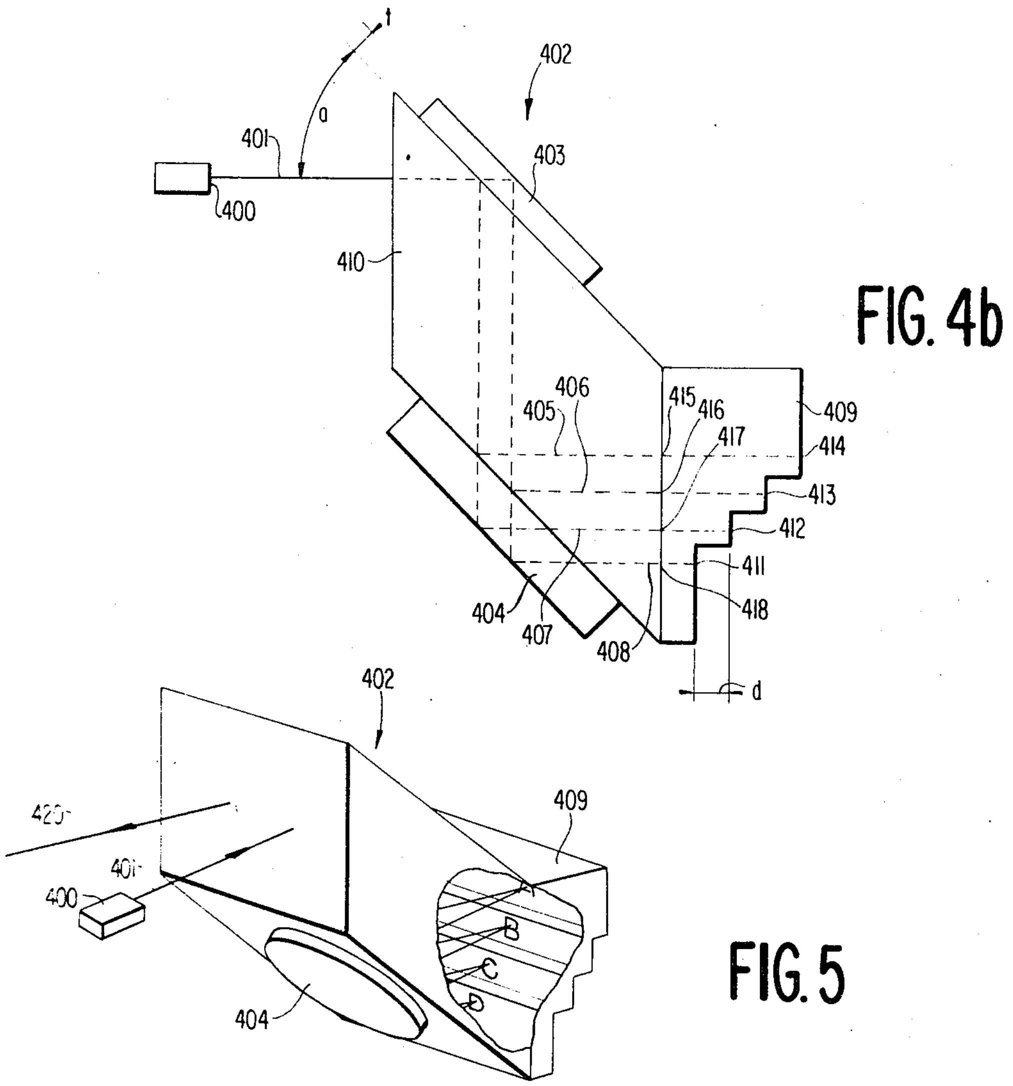

FIG. 4*a* is a top view of FIG. 4*b*, showing a reflex character generator utilizing a step mask.

FIG. 5 is an isometric view of the reflex character generator of FIGS. 4*a* and 4*b*.

GENERAL DESCRIPTION

FIG. 1 shows a two-stage example of a switchable total internal reflection (STIR) prior art character generator. Switchable, total internal reflection light deflectors are known in the art, some examples being shown in the copending application of W. K. Banks, application Ser. No. 680,804, filed Nov. 6, 1967, now U.S. Pat. 3,514,182, and in the copending application of M. Rabedeau, application Ser. No. 680,805, filed Nov. 6, 1967 now U.S. Pat. 3,514,183, both assigned to the same assignee as the assignee of this invention. Other types of total internal reflection deflectors are also known in the art.

The elements of FIG. 1 comprise a first STIR deflector 100 and a second STIR deflector 101, a character mask 102, and a light generating means or light source, 13. STIR deflectors of the type shown in FIG. 1 are fully described in the aforementioned copending applications, and need not be further described as these applications for their teachings are incorporated herein. It will suffice to say that these STIR deflectors are of the electro-optic type wherein elements 104–111 are piezoelectric actuated elements which when brought into or out of contact with elements 112 and 113, will cause the light to be reflected from various surfaces by the phenomena of total internal reflection, as shown by the various combinations of dotted lines representing various paths the light beam may take upon being deflected through the deflector. The electro-optic elements may be chosen to have a width relationship, such as where element 104 is half the thickness of element 105, the element 104 and 106, and elements 105 and 107 are of equal thickness, such that an incoming light beam upon deflection may be deflected to any one of a number of equally spaced deflection positions. The number of deflection positions available can be predetermined, and is a function of the number of stages in the deflectors. For clarity, in this prior are example, two-stage deflectors are shown, resulting in four equally-distance spaced beam positions.

In operation, light source 103 generates a light beam 114 which will be deflected by deflector 100 to any one of four predetermined positions 115, 116, 117, and 118, in response to actuation of the elements 104, 105, 106, and 107, by an actuating means, not shown. Character mask 102 is positioned in the output plane of the beam as it leaves the deflector and has characters thereon located to intercept the outgoing beam. In this prior art example, the characters are of a transmission type, to allow the beam to pass through the character mask 102 and to enter deflector 101 in character form. Such characters may be alpha-numeric characters, for example.

Deflector 101 acts as a beam collapser to bring the beam, now in character form, back to a single output plane, as illustrated by the outgoing beam 119.

As can be seen, this prior art system requires a beam deflector 100 and another beam deflector acting as a beam collapser 101. Further, the actuating means must be such as to coordinate the actuation of the electro-optic elements of both deflectors, to achieve the desired result. The outcoming beam 119 may, of course, be utilized by being focused onto a display, a printer, or for other purposes known in the art.

FIGS. 2*a* and 2*b* show the reflex character generator of this invention, that eliminates the need for the second deflection stage, the beam collapser 101 of FIG. 1. This system comprises a light source 200, a beam deflector 201, having piezoelectric elements 202, 203, 204, and 205 and a reflective character means 206, positioned to intercept the beam deflected by the light deflector means 201 during operation. The operation of the beam deflector 201 is as was described in relation to the beam deflector 100 of FIG. 1.

The reflective character means 206 has characters, such as alpha-numeric numerals, or other code-type information, located at each beam position to which the beam may be deflected during operation of the character generator. In the preferred embodiment, each of these characters is of a reflective nature, such as a silvered or aluminized figure. Thus, an incoming beam 207 generated by light means 200 and deflected by light deflector 201 will, upon impinging on the characters located upon character means 206, be reflected back through deflector 201. However, if the existing beam were to strike the character means 206 normal to character means 206, it would be reflected directly back along the same path, that is, upon itself, and interfere with the incoming beam 207. Thus, as shown in FIG. 2*a*, light source 200 and character means 206 are angularly positioned relative to each other to reflect the beam from the character means, being shown as exit beam 208, so as to allow beam 208 to exist from light deflector means 201 at an angle relative to the incoming beam from the light means 200, to separate the incoming beam 207 from the exiting beam 208. In the preferred embodiment, the light beam itself is input to deflector 201 at an angle. The necessary minimum size of the angle will, of course, depend upon the size of the light cone being input to the deflector.

Either convergent or divergent light may be used, as well as parallel collimated light. If convergent light is utilized, it is preferred that the convergence point be located at a distance greater than that distance from light source 200 to reflective character means 206.

Thus, as shown in FIGS. 2*a* and 2*b*, by using the angular relationship shown in FIG. 2*a*, an entire deflector system may be eliminated, that is, the beam collapser 101 of prior art FIG. 1.

FIG. 3 shows an isometric view of the two-stage deflector shown in FIGS. 2*a* and 2*b*. The numerals used in identifying the components of FIG. 3 are the same as in relation to FIGS. 2*a* and 2*b*. The reflective character means 206 is more clearly shown in this figure having characters A, B, C, and D located at each of the four equally-distanced spaced beam positions shown in FIG. 2*b*. It is clear, of course, that other characters other than letters may be utilized.

Referring again to FIG. 2, it is evident that the character means 206 may be totally reflective, by having totally reflective characters upon a transparent background; or may have totally reflective characters upon a transparent background; or may have totally reflective characters on a completely or substantially light absorbent background. Where it is desired to have transmission of characters, as well as reflection, the reflective characters may be partially reflecting and partially transmitting while additional optical elements, well known in the art, may be necessary if it is desired to "straighten out" the transmitted beam, the means and methods for doing this are well known in the optical art. The use of partially reflective and partially transmitting characters does, of course, allow a dual use of the system, as may be desired for particular applications.

Utilizing STIR deflectors of the type illustrated in FIGS. 1 and 2, it should also be noted that the path length of each beam through the deflector is constant. This feature is further discussed in the aforementioned copending application. This is a desired feature, though it is not an essential item. Various means of alternating the path length of the beam through a STIR deflector are discussed in the aforementioned copending applications of Banks and Rabedeau. Further, there is no particular requirement as to the type of light source utilized, i.e., monochromatic, quasi-monochromatic, coherent, or incoherent, in phase or out of phase.

FIGS. 4*a*, 4*b*, and 5 show another embodiment of this invention. In this system, as illustrated in FIG. 4*b*, an incoming light beam 401 from light source 400 enters deflector 402. Deflector 402 has two electro-optic elements 403 and 404. The use of these two stages allows four possible beam positions, 405, 406, 407, and 408. A step mask 409 is attached to the deflector body 410 and contains a series of steps separated by a width labeled *d*. Where it is desired to maintain the path length for each beam position constant upon reflection back through the deflector 402, the relationship of the distance *d* for each succeeding step is $d=t\ csc\ (a)$ where $t$ is as shown, is the thickness of the thinnest electro-optic plate, 403; and $(a)$ is the angle between the incoming light beam and the reflective surface, as shown in FIG. 4*b*. If the refractive index of materials 409 and 410 are the same or very close, there will be no or minimal deviation of the beam in passing from element 410 to step mask 409. For an index mismatch, the step height *d* computation would involve Snell's Law, which is well known in the art.

Step mask 409 has reflective characters located at each of the positions 411, 412, 413, and 414, as shown. Again, these characters can either be totally reflective or partially reflective, on a transmitting or absorbing background as described in relation to the embodiment of FIG. 2. It is also clear, that where it is unimportant that the path length of each beam through the deflector be equal, the characters may be directly positioned at the positions indicated by the numerals 415, 416, 417, and 418. They may be evenly placed directly on the deflector 410, or positioned by use of a separate mask. Once again however, the incoming beam 401 from light source 400 is entered at an angle relative to the step mask, so that the outgoing beam 420 (FIG. 4*a*) exits at an angle sufficient to allow separation of the incoming and outgoing beam.

FIG. 5 is an isometric view of the reflex character generator shown in FIGS. 4*a* and 4*b*. Alpha-numeric characters are again shown for clarity. Thus, as in the embodiment of FIG. 2, an incoming light beam 401 is reflected back to the deflector 402 in character form at an angle sufficient for separation of the incoming and outgoing beams. The same type of light source as utilized in relation to the embodiment of FIG. 2 may be utilized in this embodiment.

It should further be clear, that especially in relation to the embodiment of FIGS. 4*a* and 4*b*, that if the step mask contains holographically-encoded information, then the steps in essence are not needed. The information can be brought out on the single axis using a flat reflex holographic mask with only one deflector per stage. Path length compensation can be accomplished in the holographic encoding.

While the above embodiments have been described in relation to a STIR type deflector, it is clear that other types of electro-optic deflectors may be utilized. Thus, the electro-optic deflector as shown in the aforementioned Harris patent may also be utilized.

Thus, in both embodiments of FIGS. 2 and 4, improvements have been made in relation to the prior art. The number of light deflectors necessary has been reduced. Further, the reliability of the light beam character generator is improved by the reduction in the number of light deflection stages, as well as the cost and physical size of the entire character generator. Well-known components are utilized, and both reflex and transmission modes may be utilized simultaneously.

While this invention has been shown in particular embodiments, and especially in relation to a particular type of light deflector, it is clear that other types of light deflectors may be utilized in practicing this invention.

What is claimed is:

1. A reflex character generator comprising:

light means for generating a light beam;

light deflector means positioned to intercept the light beam generated by said light means, for deflecting the light beam to any one of a predetermined number of positions;

reflective character means positioned to intercept the beam deflected by said light deflector means, for reflecting the beam in character form back through said light deflector means;

said light deflector means having different path lengths for said beam for each of said positions, said reflective charactor means comprising stepped structure arranged to compensate for said different path lengths;

said light means and said reflective character means being anguarly positionsd relative to each other to reflect the beam from said character means to exit the light beam through said light deflector means at an angle relative to the incoming beam from said light means to said light deflector means sufficient to separate the incoming and exiting beams.

2. The reflex character generator of claim 1 wherein said light means generates a diverging light beam.

3. The reflex character generator of claim 1 wherein said light means generates a converging light beam.

4. The reflex character generator of claim 3 wherein the converging light beam generated by said light means has a path length to convergence greater than the path length from said light means to said reflective character means.

5. The reflex character generator of claim 1 wherein said light deflector means comprise electro-optic light deflector means.

6. The reflex character generator of claim 5 wherein said electro-optic light deflector means comprises a switchable total internal reflection deflector.

7. The reflex character generator of claim 1 wherein said reflective character means is partially reflecting and partially transmitting.

8. The reflex character generator of claim 1 wherein said reflective character means comprises totally reflecting characters on a light transmitting background.

9. The reflex character generator of claim 1 wherein said reflective character means comprises reflecting characters on a substantially light absorbing background.

10. The reflex character generator of claim 1 wherein said reflective character means comprises partially transmitting and partially reflecting characters on a light absorbing background.

11. The reflex character generator of claim 1 wherein said step-mask maintains the path length of the light beam deflected by said deflector means constant independent of the one of the predetermined number of positions to which said light deflector means deflects the light beam.

12. The reflex character generator of claim 1 wherein said step-mask physically contacts said light deflector means.

13. The reflex character generator of claim 12 wherein said light deflector means is a switchable total internal reflection light deflector.

14. A light beam method of generating a character comprising the steps of:

generating via a light means a light beam;

deflecting the light beam via deflecting means to any one of a number of predetermined positions, said deflecting means having different path lengths for said beam for each of said positions;

reflecting the light beam from a reflective character means after said deflecting of the light beam, back through said deflecting means;

compensating for said different path lengths via said reflective character means having stepped structure, the incoming light beam from said light means being angularly directed through said deflecting means as to result in a non-normal reflection of the beam in character form from said reflective character means, whereby the incoming and outgoing beams from said deflecting means are separate from each other.

References Cited

UNITED STATES PATENTS

| | | | |
|---|---|---|---|
| 3,450,460 | 6/1969 | Brown | 350—150 |
| 3,403,260 | 9/1968 | Geusic et al. | 350—150 |
| Re 26,170 | 3/1967 | Harris | 346—107 |
| 3,343,451 | 9/1967 | Dutochet | 353—25 |
| 3,485,552 | 12/1969 | Adler | 350—160 |
| 3,514,183 | 5/1970 | Rabedean | 350—160 |
| 3,144,807 | 8/1964 | Coombs | 350—285 |

LEONARD FORMAN, Primary Examiner

S. L. STEPHAN, Assistant Examiner

U.S. Cl. X.R.

350—160 R, 285